April 22, 1958     F. D. HANSON ET AL     2,831,722
EXPANSIBLE TRAILER
Filed March 9, 1954                                                      6 Sheets-Sheet 1
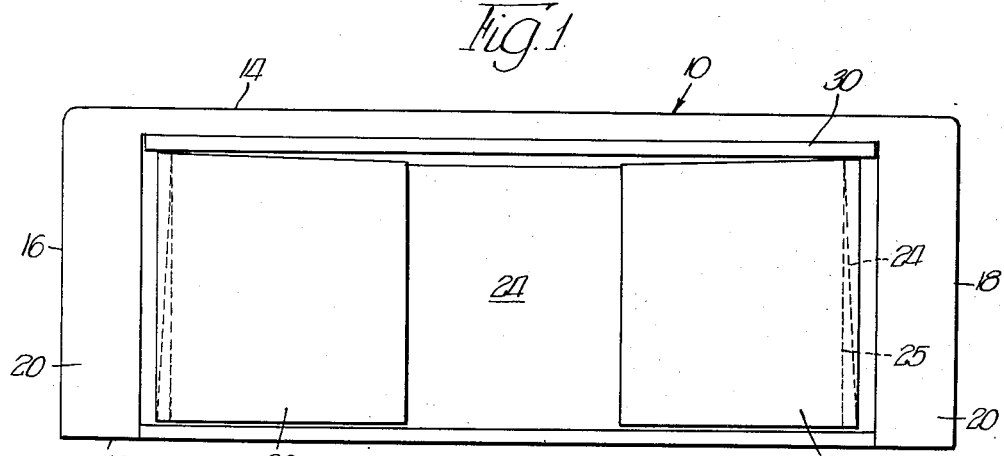
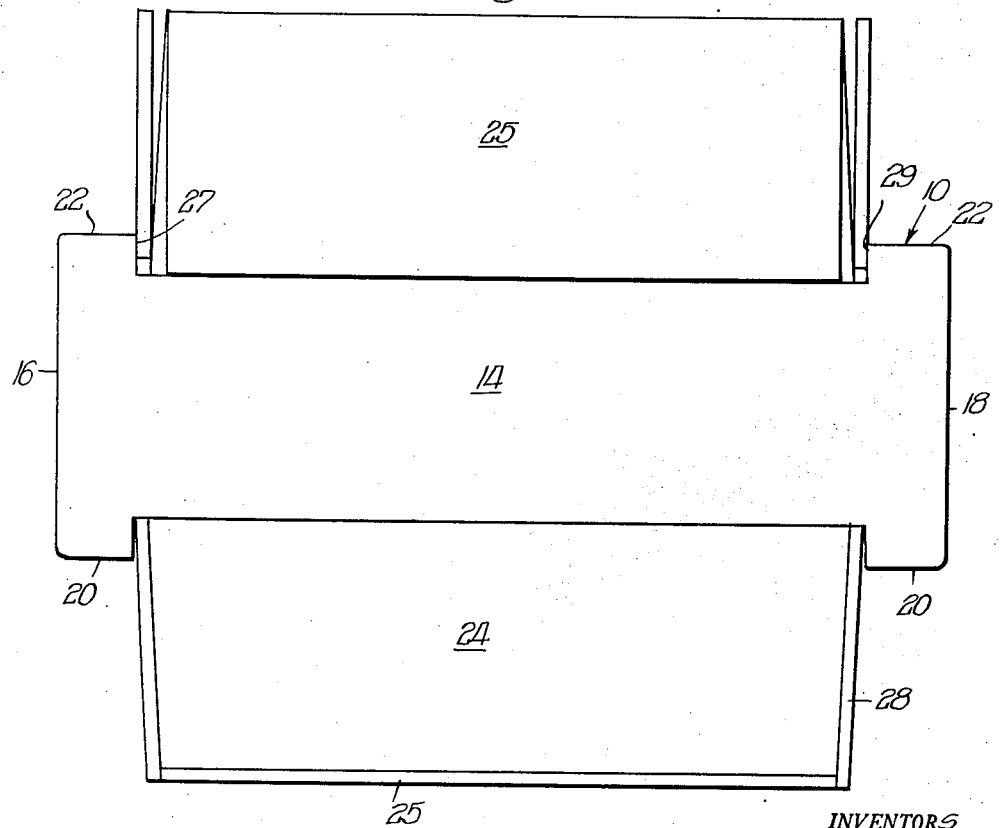
INVENTORS
Frank D. Hanson,
Clyde F. Wait,
BY Donald F. Cole,
Wilkinson, Huxley,
Byron and Hume
attys

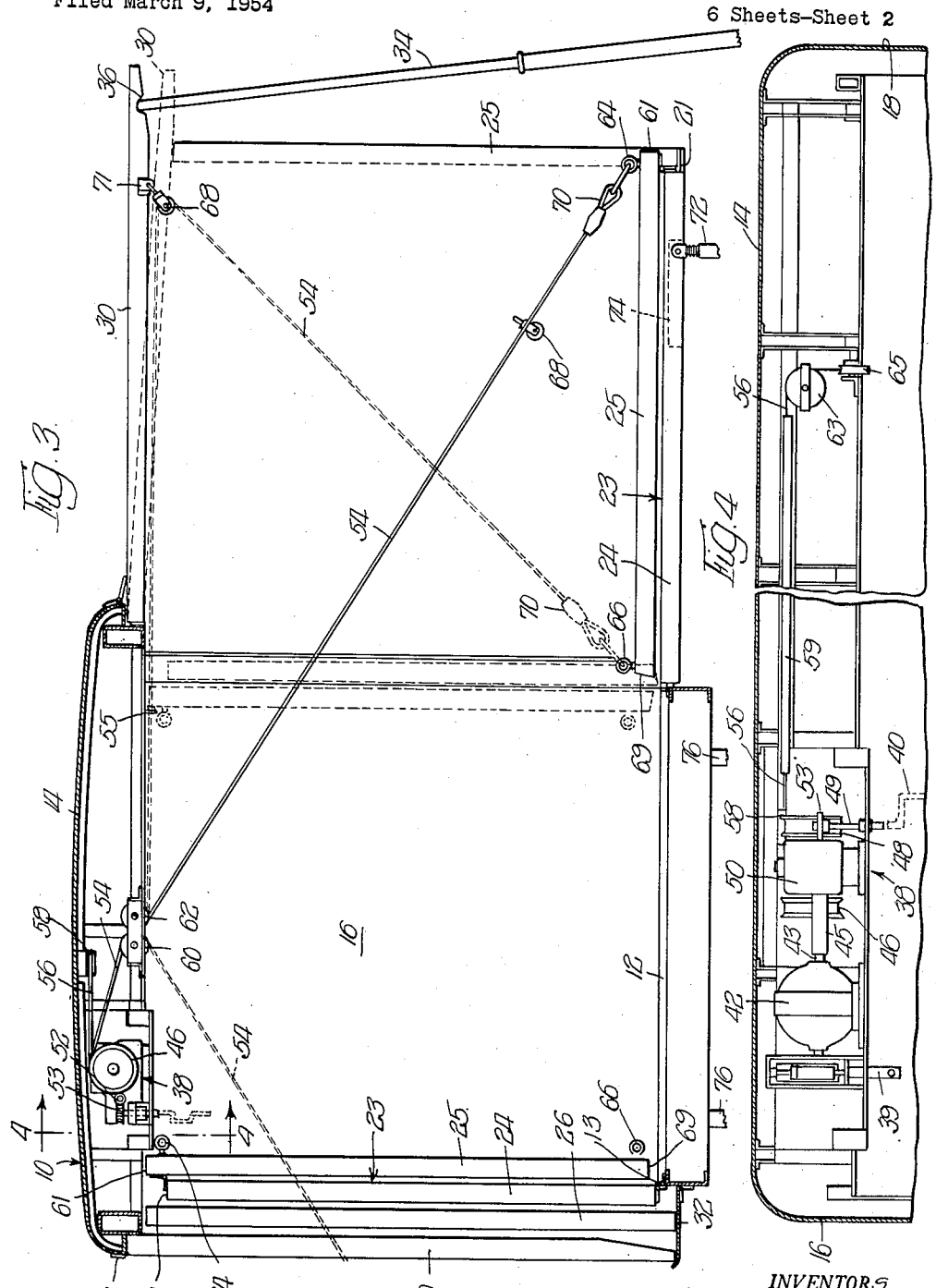

April 22, 1958 F. D. HANSON ET AL 2,831,722
EXPANSIBLE TRAILER
Filed March 9, 1954 6 Sheets-Sheet 3
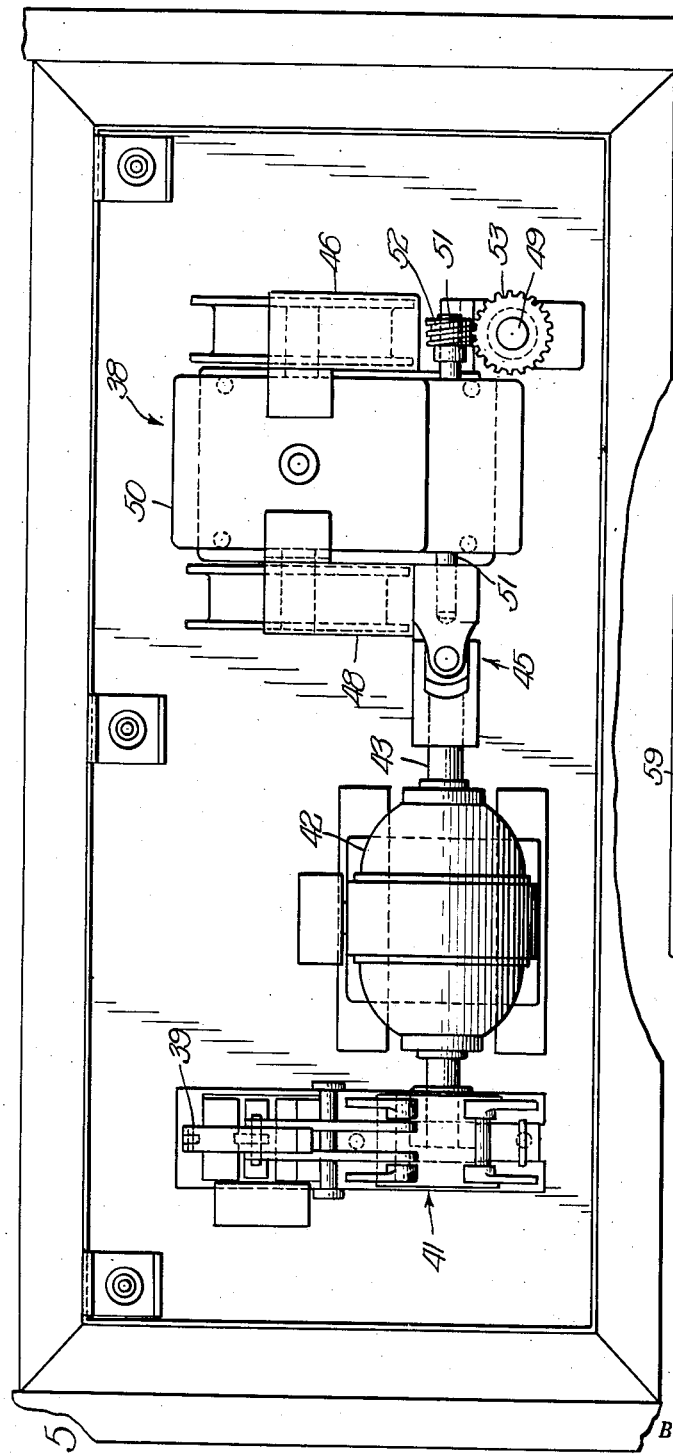
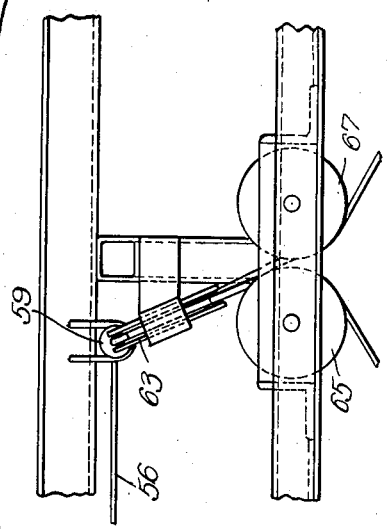
INVENTORS.
Frank D. Hanson,
Clyde F. Wait,
Donald F. Cole,
BY Wilkinson, Huxley
Byron & Hume
ATTYS.

April 22, 1958 F. D. HANSON ET AL 2,831,722
EXPANSIBLE TRAILER
Filed March 9, 1954 6 Sheets-Sheet 4
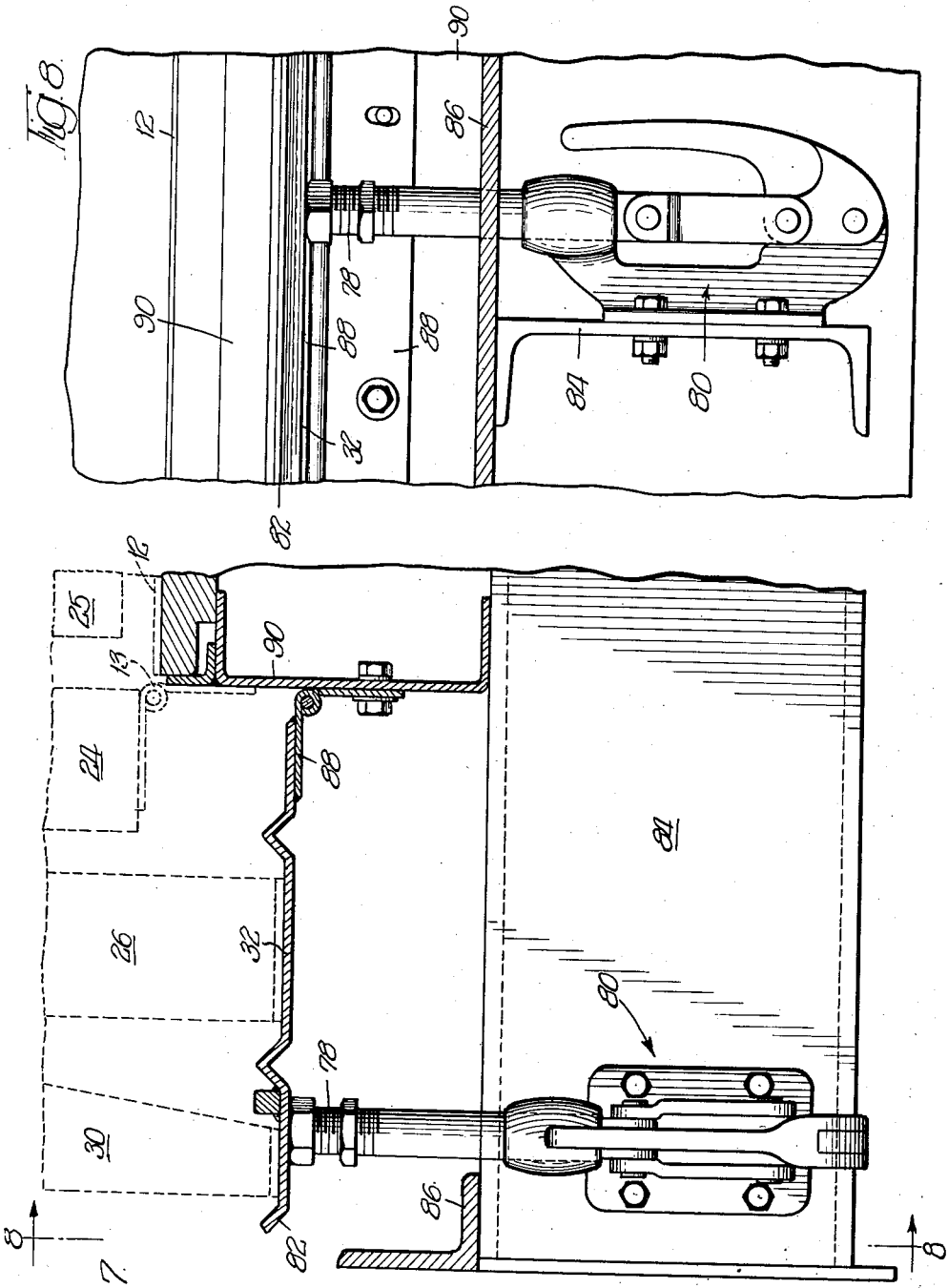
INVENTOR.
Frank D. Hanson
Clyde F. Watt,
BY Donald F. Cole,
Williamson, Huxley
Byron & Hume
Attys.

April 22, 1958 F. D. HANSON ET AL 2,831,722
EXPANSIBLE TRAILER
Filed March 9, 1954 6 Sheets-Sheet 5
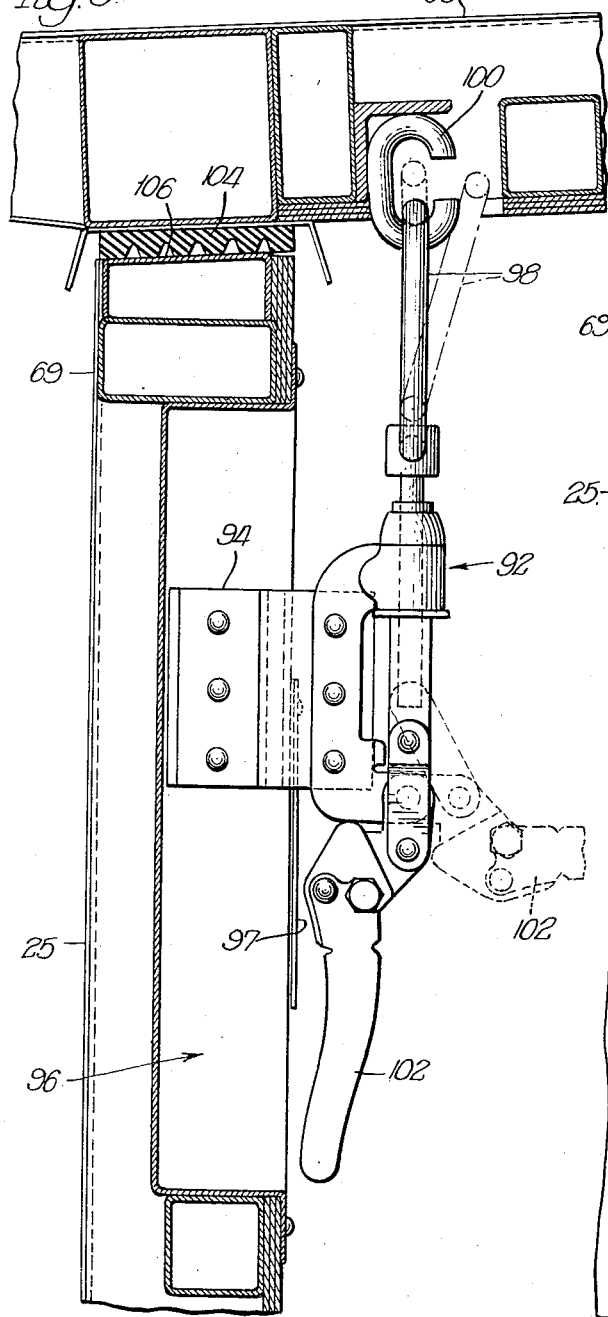
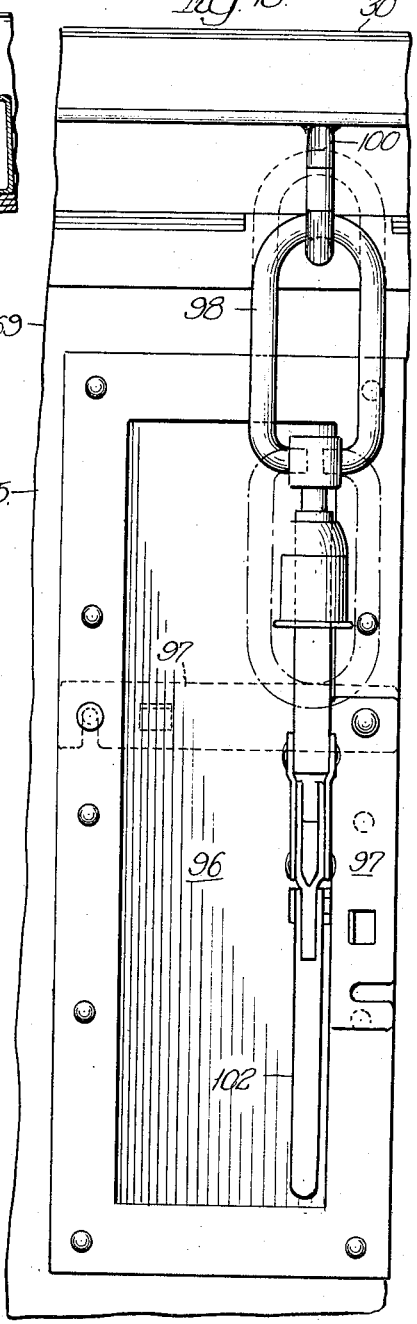
INVENTORS.
Frank D. Hanson,
BY Clyde F. Wait,
Donald F. Cole,
Williamson, Hursley
Byron & Hume
Attys.

April 22, 1958
F. D. HANSON ET AL
2,831,722
EXPANSIBLE TRAILER
Filed March 9, 1954
6 Sheets-Sheet 6
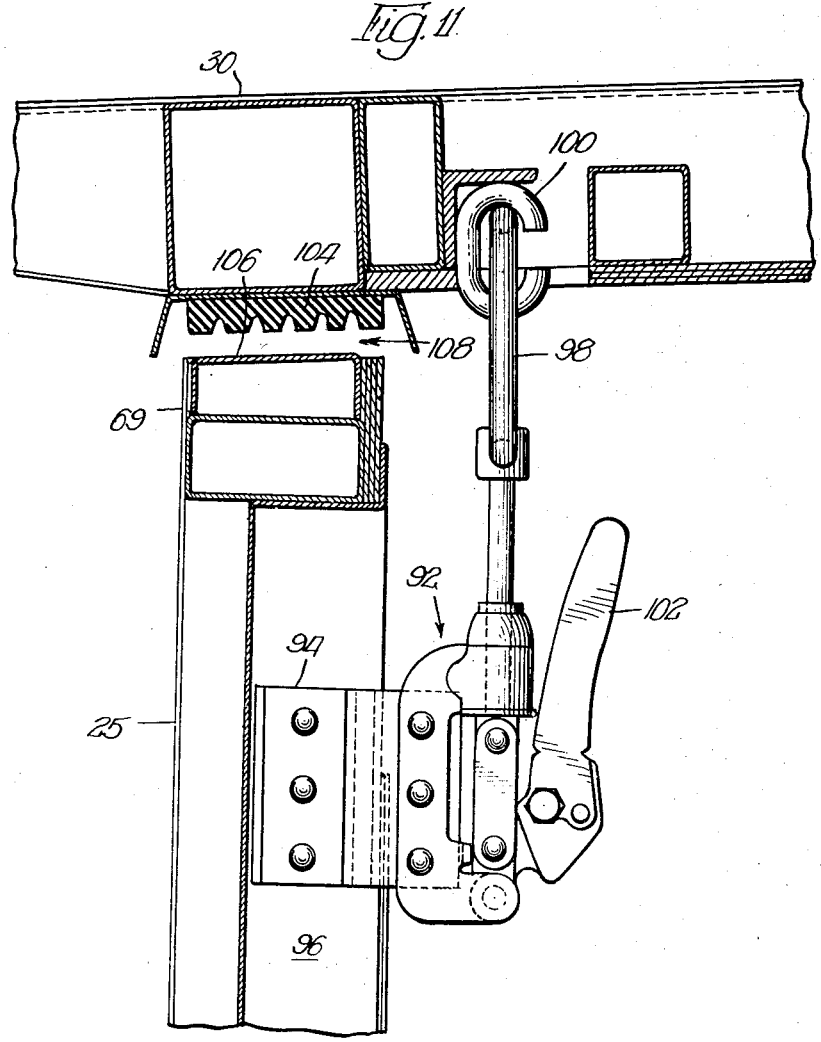
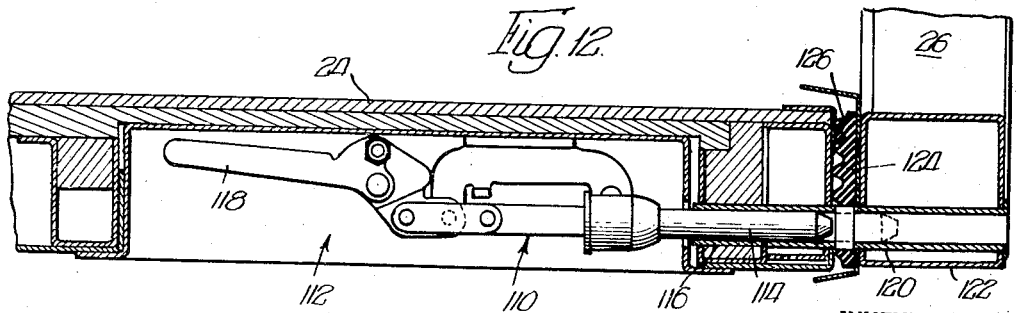
INVENTORS
Frank D. Hanson,
Clyde F. Wait,
Donald F. Cole,
BY

United States Patent Office 2,831,722
Patented Apr. 22, 1958

2,831,722

EXPANSIBLE TRAILER

Frank D. Hanson, Clyde F. Wait, and Donald F. Cole, Flint, Mich., assignors to Palace Corporation, Flint, Mich., a corporation of Michigan Application March 9, 1954, Serial No. 414,929

1 Claim. (Cl. 296—23)

This invention relates to expansible dwelling structures and more particularly to such structures as are adapted for use as trailers.

Although various types of expansible trailers have been devised heretofore, they are subject to the difficulty that the expanding operation requires considerable effort, as well as complicated maneuvering, and the employment of a crew of workers of substantial size.

An object of the present invention, therefore, is to provide a trailer, the sides of which may be raised and lowered according to a novel pulley and cable method, thereby greatly facilitating the folding and unfolding operation.

A further object is to provide an expansible trailer which is very readily expanded to constitute a dwelling unit.

Another object is to provide a trailer of the type indicated which may employ a motor driven winch to cooperate with a pulley and cable system to effect the necessary movement of parts.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a somewhat diagrammatic side elevation of an expansible building unit according to the present invention with the wing roof being shown in the elevated position;

Figure 2 is a somewhat diagrammatic plan view from above of an expansible building unit according to the present invention with the wing roofs removed, the wing floors on one side being shown in the extended position with the wing side wall still folded thereupon, and the wing end walls being shown in the fully extended position; the wing floor side wall, and end walls on the other side being shown in the fully assembled position.

Figure 3 is a vertical section of a building unit according to the present invention, wherein one wing assembly is shown in partially expanded condition, the fully extended position being shown in dot-and-dash form, and the other wing assembly being shown in the folded condition;

Figure 4 is a fragmentary vertical section taken along the line 4—4 of Figure 3 and disclosing the power and pulley means used for raising and lowering the wing floor and wing side wall sections as a unit;

Figure 5 is a plan view of a form of power means which may be used for raising and lowering the wing floor and wing side wall elements;

Figure 6 is an enlarged side elevation of a portion of the pulley assembly shown in Figure 4;

Figure 7 is a fragmentary view in vertical section of a portion of the base of the trailer and the wing elements showing one of the supporting units for the latter;

Figure 8 is a plan view of the portion of the base shown in Figure 7, the supporting unit being viewed from the side;

Figure 9 is an enlarged fragmentary view in vertical section of a portion of the roof element and the side wall at their point of abutment, showing one of the clamping mechanisms and the recess provided therefor;

Figure 10 is a plan view of the clamping mechanism shown in Figure 8 together with a portion of the elements associated therewith;

Figure 11 is the same view as Figure 9 with the roof element being shown in the raised position; and Figure 12 is an enlarged view in vertical section of a portion of a wing floor and wing end wall showing the manner of interconnecting these elements.

Referring particularly to Figures 1, 2 and 3, an expansible trailer of the type heretofore described, is shown therein which is adapted to be expanded to form separate side wing units on each side thereof. For this purpose, a unique arrangement of the various elements of the side wing units and a method for moving them is herein disclosed. Inasmuch as both of the two side wing units are constructed according to identical principles and with similar parts, this description will generally refer to but one of the said units.

The trailer is provided with a central body unit 10 having a floor 12, a roof 14, and as seen in Figures 1 and 2, end walls 16 and 18 and side walls 20 and 22. As best seen in Figures 2 and 3, the side walls 20 and 22 have their central portions cut away to permit nesting of the elements of the wing assemblies therein. A wing floor 24 is hingedly secured to the outer upper edge 13 of the main floor 12 of the central body unit, as best shown in Figure 3. This wing floor is adapted to swing downwardly when the side wing unit is being unfolded. A wing side wall 25 is likewise hingedly secured to the outermost longitudinal edge 21 of the wing floor 24 and is adapted to fold adjacent to the wing floor on the side 23 thereof, which side is uppermost when the said wing floor is moved to the expanded position. It may be seen, therefore, that the wing floor 24 and wing side wall 25 may be moved as a unit both downwardly, so as to be disposed in extended parallel relationship with the main floor 12 of the trailer, as shown on the right side of the trailer as viewed in Figure 3, and upwardly into substantially perpendicular relationship to the main trailer floor, as viewed on the left side of that trailer.

When the wing floor and wing side wall unit is in the vertical or folded position, wing end walls 26 and 28, which are hingedly secured to the outer vertical edges 27 and 29 of the opening in the side wall 20 of the central body unit may be swung inwardly to overlap the bottom of the wing floor in juxtaposed relation to one another, as best shown in Figure 1. A wing roof element 30 may be hingedly secured to the outer edge 31 of main roof 14, as shown in Figure 3. When the wing side walls, the wing floor and the wing end walls are disposed in parallel vertical relation beneath the main roof 14, the wing roof 30 may be swung downwardly into similar parallel relation with the other movable elements to form the exterior wall of the trailer when it is in the folded position for transportation. When the wing assemblies of the trailer are thus folded, the wing roof 30 and wing end wall elements 26 and 28 may be secured in position by means of the support elements 32 which are hingedly secured to the lateral edges of the main floor 12, as shown in Figures 3 and 7, and which will be described subsequently in greater detail.

A novel cable and pulley arrangement may be provided according to this invention to effect both the raising and lowering of the wing side wall and wing floor as a unit, as well as the raising of the wing side wall element into vertical position after the wing floor element is in place in the expanded position as an extension of the main floor unit 12. Preliminary to these movements, however, the wing roof 30 must be swung outwardly and upwardly, which may be accomplished, for example, by means of separate extension-lifting poles 34 seen in Figure 3. These poles may be inserted within sockets 36 in the wing roof to hold the wing roof in elevated position slightly above a position parallel to the main roof 14.

A winch assembly, indicated generally by the numeral 38, is provided to activate the control cables. This whole assembly may be mounted as shown as a unit on a frame hingedly secured to the roof of the trailer so that it may be swung down for better access if necessary. A pair of drums 46 and 48 are included in the winch assembly and are mounted for rotation on the gear box 50 which has a drive shaft 51 protruding from both sides thereof. A helical gear 52 is mounted on one end of the shaft 51 and is adapted to be driven by the gear 53 with which it co-operates, the latter gear being mounted on the shaft 49 as best shown in Figure 4. The shaft 49 is adapted to be rotated manually by means of the speed wrench 40, when desired, which in turn causes the shaft 51 to be rotated.

The shaft 51 has a universal joint, indicated generally by the numeral 45, secured to its other end to which is secured, in turn, the shaft 43 of the electric motor 42. The winch assembly 38 is therefore also adapted to be driven by the electric motor 42. An electrically released, spring-applied magnetic brake 41 may be utilized to control the motor 42 and a manual release 39 therefor may also be provided, both of these latter elements being shown in somewhat diagrammatic form in Figure 5. It should be understood that the normal position of the magnetic brake 41 is such as to brake the motor 42 in the absence of electrical activation. The manual control 39 is also adapted to normally be in the braking position and will only serve to release the brake mechanism when it is pulled down, the lower end of the element 39 protruding into the interior of the trailer for this purpose, as shown in Figure 4.

When manual operation is desired, it is therefore necessary to pull down on the manual release 39 and to simultaneously operate the speed wrench 40. Suitable electrical controls are provided for the motor 42 so that it can be driven in either direction for both raising and lowering purposes, the brake 41 in either case being released when current is applied to the motor 42 and being immediately applied when the current is interrupted. This, of course, means that the "up" and "down" buttons controlling the operation of the motor 42 may be released at any time during the raising or lowering operation, and the elements being moved will remain in the position existing at the time the button is released.

A plurality of limit switches may also be provided which, when activated, will automatically de-energize the motor 42. The limit switch 55, shown in Figure 3, for example, is disposed so that when the elements 24 and 25 are raised as a unit to the dotted line position shown, the energizing of motor 42 will be interrupted automatically by the stop limit switch 55. This occurs, of course, when these two elements 24 and 25 have reached the desired vertical position. By appropriate disposition of these stop limit switches there will be no overrunning by any of the elements as they are being moved into position.

The drum 46 of the winch assembly 38 is adapted to control the front cable 54 and the drum 48 is adapted to control the rear cable 56, as seen in Figures 3 and 4. The sheave 58 is secured to the roof 14 as a guide element for the rear cable 56 while the sheaves 60 and 62 are dependently secured to the roof element as guide-means for the front cable 54. With the sheaves 60 and 62 arranged adjacent to one another in the same plane they can be used alternatively in conjunction with the elevation of either the left or the right side wing units, as shown in Figure 3.

As seen in Figures 4 and 6, the cable 56 extending through sleeve 59 is similarly passed over a sheave 63 to aid in positioning either the left or right wing units by means of adjacent sheaves 65 and 67, respectively.

Each wing side wall 25 is provided at its outer lowermost edge 61 with an eyebolt 64 and at its outer uppermost edge 69 with an eyebolt 66. The hook pulley 68 has the cable 54 passed through its yoke and may be secured to the outer underlying edge of the wing roof 30 on the shackle 71. Accordingly, when it is desired to raise the wing side wall and wing floor elements as a unit from the partially extended position, shown in full in Figure 3, the bull snap 70 at the end of the cable 54 may be secured to the eyebolt 64 and the cable 54 may then be wound onto the drum element 46, guided by the sheaves 60 and 62. This operation may be effected either by speed wrench 40, as aforesaid, or by operation of the motor 42. Pulley 68 is at such time disengaged from shackle 71.

Similarly, when it is desired to raise the wing side wall, from parallel relation with the extended wing floor, into vertical position beneath the wing roof 30, the hook pulley 68 is secured to the shackle 71 and the bull snap element 70 is secured to the eyebolt 66, whereupon, the cable is wound on the drum element 46 until the stop limit switch 55 is activated by the edge 61 of the side wall 25 coming into abutment therewith.

It will be appreciated that lowering of these elements will be effected in substantially the same manner by reverse operation of the motor 42, or a reverse cranking of the speed wrench 40.

This pulley and cable arrangement provides a means of readily unfolding and folding the expansible wing elements of the trailer. The fact that the roof element 30 is pivotally mounted at its upper edge makes it possible to handle this element manually with the aid of the poles 34. When the load increases, as the element 30 approaches the horizontal position, the poles 34 can be utilized as props, as shown in Figure 1. With respect to the end walls 26 and 28, no problem is presented in the opening of these elements since the entire load is borne by the hinged connections between these elements and the central portion of the body of the trailer.

With respect to the side wall 25 and the floor 24, however, a much heavier load is involved, since the two elements are moved as a single unit through part of the opening and closing procedure. In addition, since these elements are pivoted at their base the initial load in lifting them from the lowest position is very great. Likewise, there is no ready manual method of controlling the load, such as with the poles 34 used in connection with the roof element 30. The relatively simple yet effective cable and pulley mechanism which has been described permits the ready handling of the movable elements 24 and 25 without any danger of the load getting out of control. The limit switches 55, previously described, also insure that proper control is maintained.

A plurality of adjustable jacks 72 may be hingedly secured to the outer exterior surface of the wing floor unit, adapted to be received in the slot elements 74 when the said wing floor is swung upwardly for purposes of folding. Other jack elements 76 may be utilized as desired to support the main body of the trailer 10 when the trailer is to be uncoupled from the vehicle and parked.

As previously indicated, a support element 32 may be provided adapted to support the wing roof and wing end wall elements 26 and 28 when these elements are in the folded condition and to act also as a dust and dirt protector. As shown in Figures 7 and 8, adjustable support means for the element 32 are provided by a plurality of rods 78 which may be raised and lowered by means of toggle clamps 80. The support elements 32 may be provided with an upwardly displaced outer longitudinal edge 82 so as to further secure the wing floor and wing end walls in folded position when the toggle clamps 80 have elevated the rods 78 into supporting relationship with the units 32. The clamps 80 may be secured to the transverse channel 84 secured, in turn, beneath the floor frame cross member 86. A continuous hinge 88 may be used to pivotally secure the member 32 to the supporting frame 90 for the floor 12.

In unfolding the wing units the support element 32 will first be moved downwardly by release of the toggle clamp 80 and the roof 30 will be swung outwardly and upwardly to be securely positioned by poles 34 at a height sufficient to permit unimpeded pivoting of the wing end walls 26 and 28 around the hinge connections between the said wing end walls and main end walls 16 and 18. Upon completion of this first operation, the wing end walls, constituting the next outer layer, will be swung outwardly about the vertical hinged connection with main side wall 20 to a position substantially parallel with the main end walls. To permit free motion of the wing floor and wing side wall unit upwardly or downwardly the various wing units may have their lateral edges slightly tapered, such as is shown in exaggerated form for the floor unit 24 in Figure 2; this feature of construction is more fully described in copending application Serial No. 414,968, filed March 9, 1954, owned by the same assignee.

As previously stated, the combination of the side wall and floor elements requires more force for lateral pivotal motion than do the end wall and roof elements and the cables 54 and 56 are therefore initially secured thereto for lowering by means of the bull snaps 70 as aforesaid. The unit comprising the wing floor and side wall may then be pivoted downwardly about the hinged connection between main floor and wing floor either by use of the speed wrench 40 or by operation of the motor 42. This downward pivoting of the floor unit will thus effect the release of the jack elements 72 from the recesses 74 in the wing floor, said jacks thereby forming perpendicular supports for the wing floor when that element is in substantially parallel alignment with the rigid central floor 12. It is then necessary to raise the wing side wall hingedly secured to the wing floor into perpendicular relationship thereto by securing the pulley elements 68 to the shackles 71 on the outer lower edge of the wing roof and securing the bull snaps 70 affixed to the ends of the cables to the eyebolts 66 to pivot the wing side wall upwardly and outwardly about the horizontally hinged connection between the wing side wall and the wing floor. The wing end walls 26 and 28 may then be pivoted inwardly to abut the wing side wall thus positioned, and the wing roof 30 set down upon the supporting side wall to complete the operation.

The manner in which the roof element 30 is secured to the side wall 25 is illustrated in Figures 9 and 10 in which a toggle clamp 92, similar to the toggle clamp 80 previously described, is shown secured to the inner side of the wall 25 by the hinge member 94. The hinge member 94 is secured within a recess 96 provided in the wall 25 so that when the clamp member 92 is not in use it may be swung into the recess where it may be secured by the latch member 97. As shown in Figure 9 the roof element 30 may be securely clamped to the upper edge 69 of the side wall 25 by first inserting the link 98 into the C-bracket 100 which can be accomplished when the handle member 102 of the clamp is in the position shown in dotted lines. When the link 98 has been so inserted the handle member 102 may be drawn downwardly into the lowermost position which will cause the roof member 30 to be drawn down against the upper edge 69 of the side wall 25 so as to press the resilient sealing member 104 against the bearing plate 106. This provides a weathertight seal at this point and also serves to hold the elements 25 and 30 in rigid relation one to the other.

The clamp member 92 also can serve an additional purpose in that when the handle 102 has been moved to the position shown in Figure 11 with the link 98 retained within the C-bracket 100, the roof element 30 will be raised out of abutment with the upper edge 69 of the side wall 25. This will provide an opening 108 between the upper edge 69 of the side wall 25 and the roof element 30. This opening may sometimes be desirable for purposes of ventilation since it is contemplated, for example, that trailers of this type may be utilized to house various types of equipment for military purposes which may give off considerable heat.

The manner in which the wing end walls 26 and 28 may be secured to the floor element 24 is shown in Figure 12. A clamp member 110 is mounted within a recess 112 on the lower surface of the floor 24 and a shear pin 114 is adapted to be moved longitudinally in a collar or sleeve 116 by operation of the handle 118 on the clamp 110. A similar sleeve 120 is provided in the lower end 122 of the end wall 26 so that when the sleeves 116 and 120 are in substantial alignment the shear pin 114 can be moved by operation of the clamping member 110 into the sleeve 120. This position is shown in dotted lines in Figure 12. A seal 124, similar to the seal 104 previously described, may be disposed between the inner surface of the lower end 122 and the lateral edge 126 of the floor 24. A similar sleeve (not shown) may be provided in the main side wall 20 to receive the pin 114 so that the floor 24 can be locked in the vertical folded position by appropriate operation of the clamping member 110.

Thus by this novel arrangement using toggle clamp members the various connections between the movable wing elements may be readily accomplished after the elements themselves have been moved into position.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claim.

It is claimed:

An expansible trailer comprising a central fixed unit having a rigid floor, roof, and end walls; a wing floor pivotally connected along one side to said rigid floor; a wing side wall pivotally connected to the opposite side of said wing floor; a wing roof pivotally connected to said rigid roof; winch means for raising and lowering said wing side wall; said winch means mounted on a frame hingedly secured to said roof so that said winch may be swung downwardly for better access when necessary; a cable controlled by said winch means; electrically energized means for activating said winch means; stop limit switch members for de-energizing said electrically energized means when said wing side wall and said wing floor are moved to said closed position; means for removably securing said cable at the outer uppermost edge of said wing side wall opposite said connection to said wing floor; means for removably securing said cable at the outer lowermost edge of said wing side wall adjacent said connection to said wing floor; support members for supporting said roof in raised position so that said roof may be swung outwardly and upwardly and securely positioned by said support members at a height sufficient to permit unimpeded pivoting of said end walls; means including a detachable pulley secured at the under side of the outer margin of said wing roof for passing said cable so that said wing floor and said wing side wall may be raised as a unit when said pulley is detached and said cable is secured to said outer lowermost edge of said wing side wall, and said wing side wall may be raised from parallel relation with said wing floor to vertical position when said pulley is secured to the outer margin of said wing roof and said cable is secured to said outer uppermost edge of said wing side wall.

References Cited in the file of this patent

UNITED STATES PATENTS

| | | |
|---|---|---|
| 559,962 | Bierstadt | May 12, 1896 |
| 566,127 | Bierstadt | Aug. 18, 1896 |
| 862,573 | Mears et al. | Aug. 6, 1907 |
| 1,154,791 | Marr | Sept. 28, 1915 |
| 1,964,894 | Rohne | July 3, 1934 |
| 2,167,557 | Stout | July 25, 1939 |
| 2,395,691 | Smith | Feb. 26, 1946 |
| 2,512,565 | Hallander | June 20, 1950 |
| 2,739,833 | Schenkel et al. | Mar. 27, 1956 |

FOREIGN PATENTS

| | | |
|---|---|---|
| 482,243 | Canada | Apr. 8, 1952 |
| 376,998 | Great Britain | July 21, 1932 |